(12) United States Patent
Singh

(10) Patent No.: US 10,819,587 B2
(45) Date of Patent: Oct. 27, 2020

(54) METHODS AND SYSTEMS FOR ANALYSIS OF PROCESS PERFORMANCE

(71) Applicant: ServiceNow, Inc., Santa Clara, CA (US)

(72) Inventor: Manjeet Singh, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 105 days.

(21) Appl. No.: 16/292,066

(22) Filed: Mar. 4, 2019

(65) Prior Publication Data

US 2020/0287802 A1  Sep. 10, 2020

(51) Int. Cl.
*G06F 15/173* (2006.01)
*H04L 12/24* (2006.01)

(52) U.S. Cl.
CPC ........ *H04L 41/5016* (2013.01); *H04L 41/046* (2013.01); *H04L 41/142* (2013.01); *H04L 41/5032* (2013.01)

(58) Field of Classification Search
USPC ....... 709/203, 206, 217, 219, 223, 224, 226, 709/228, 230, 232, 238; 726/22; 1/2
See application file for complete search history.

(56) References Cited

U.S. PATENT DOCUMENTS

| | | | | |
|---|---|---|---|---|
| 9,390,082 B1* | 7/2016 | Stolte | ...................... | G06F 40/18 |
| 10,216,621 B1* | 2/2019 | Rutten | ................ | G06F 16/2455 |
| 2012/0284790 A1* | 11/2012 | Bhargava | ............ | G06F 11/3612 |
| | | | | 726/22 |
| 2017/0155939 A1* | 6/2017 | Prasad | .................. | H04N 21/252 |
| 2018/0089601 A1* | 3/2018 | Link | ................. | G06F 16/90335 |
| 2019/0312789 A1* | 10/2019 | Asbi | ....................... | H04L 41/22 |
| 2020/0012493 A1* | 1/2020 | Sagy | ....................... | H04L 43/08 |
| 2020/0228412 A1* | 7/2020 | Abu Asba | ............... | H04L 41/14 |
| 2020/0236006 A1* | 7/2020 | Asba | ....................... | H04L 41/20 |

FOREIGN PATENT DOCUMENTS

EP        3396898 A1     10/2018

OTHER PUBLICATIONS

International Search Report and Written Opinion for PCT Application No. PCT/2020/020198, dated Jun. 9, 2020; 12 pgs.

* cited by examiner

*Primary Examiner* — Quang N Nguyen
(74) *Attorney, Agent, or Firm* — Fletcher Yoder PC

(57) ABSTRACT

A system and method is disclosed for performance analysis of processes in a managed network. Processes may be represented as sets of activities, and an audit database may be configured for logging activities within the managed network. Database may include fields to identify process instances, process classes, process states, and process transitions. A server device may receive a request from a client device to view information representative of multiple process instances. The server device may select a plurality of process instances according to filter criteria applied to the data fields of the audit database records, and generate a graphical representation of interconnections between the one or more data fields of the selected plurality based on a statistical analysis of the one or more data fields of the audit database records corresponding to the selected plurality of process instances. The server may then transmit the graphical representation to the client device.

20 Claims, 14 Drawing Sheets

| ID | CLASS | OLD STATE | NEW STATE | TIME | ENTERED BY |
|---|---|---|---|---|---|
| 1E3391 | Incident | Open | Register | 2018-12-23-14:10 | User |
| 277F02 | Incident | Escalate | Internal | 2018-12-23-14:13 | Support |
| 46911A | Incident | Escalate | Outsource | 2018-12-23-14:19 | Support |
| 596F8B | Change | Assign | Resolve | 2018-12-23-14:22 | System Admin |
| 3739054 | Problem | Report | Specialis | 2018-12-23-14:23 | Network Admin |
| ... | ... | ... | ... | ... | ... |

FIG. 7B

METHODS AND SYSTEMS FOR ANALYSIS OF PROCESS PERFORMANCE

BACKGROUND

Managed networks may include various types of computer networks that can be remotely administered. This management may involve one or more computing devices disposed within a remote network management platform collecting information about the configuration and operational states of software applications executing on behalf on the managed network, and then presenting representations of this information by way of one or more user interfaces. The user interfaces may be, for instance, web-based user interfaces. In some instances, remote management of networks may be provided by a third party, such as a service provider or vendor.

Network management, including remote network management, may involve numerous processes carried out autonomously, semi-autonomously with human interaction, and manually through user actions. Network management processes may support network operations, such as infrastructure and performance monitoring, maintenance, and problem/issue detection and resolution. For example, a network management process may be an "problem management process" used to enable reporting of a network issue/problem, such as unavailability of a server or loss of connectivity, to IT personnel, and then to guide or direct actions towards a resolution according to a predetermined workflow or trouble-shooting flow chart.

A managed network itself may also support the mission and operations of an organization or enterprise, and the mission and operations may also involve autonomous, semi-autonomous, and manual processes. For example, a "problem" in a supply chain process of a manufacturing enterprise might be an unexpected interruption in a component supply, and the enterprise might have a problem management process in place for reporting and resolving such a problem.

These are just two examples of the types of processes that may be part management of a network and/or of a mission/purpose of an organization or enterprise that relies on a network. It may be of interest to owners, operators, and/or users of networks and/or organizations/enterprises that rely on the networks to be able to evaluate and analyze how the processes themselves are performing, in order to help ensure smooth and effective operations, as well as to update and/or revise the processes as possibly warranted by the evaluation and analysis.

SUMMARY

Conventional techniques for evaluating and/or analyzing performance of processes used in network management and/or operations management of organizations/enterprises may entail significant human monitoring and observation of the processes as they occur or are carried out. A typical scenario might involve engaging services of an operations consulting firm to provide personnel to observe and study various processes in action in an attempt to identify possible inefficiencies or other shortfalls of existing processes, and then recommend possible improvements to address the identified problems or issues. This and other, similar, conventional approaches may be tedious, time-consuming, and costly.

The inventor has recognized that a managed network, including a remotely managed network, may be configured to automatically collect information associated with active processes, which can then be used in an automated analysis of process performance. More particularly, activities associated with processes may be logged in database that records such information as individual process identifiers, process categories, process states and state transitions, timestamps, and identities of initiators/actors of actions associated with state changes. This information, which may be collected continuously and/or on an event-driven basis, can provide a basis for statistical analyses of processes involved in network and/or organization/enterprise management and operations. Such statistical analyses may be used to evaluate process performance from multiple perspectives. By taking advantage of information automatically logged in the database, and using computer-implemented analysis tools to evaluate the data, the significant disadvantages of conventional process performance analysis may be overcome.

In accordance with example embodiments, a remote network management platform may provide processes and process building blocks for support of both network management and operations and enterprise/organization management and operations. Process building blocks may be used to develop new and/or custom processes as necessary or desirable. Also in accordance with example embodiments, the remote network management platform may provide a system or facility for evaluating and analyzing process performance based on process activities logged to the database.

Processes may be classified according process "classes" corresponding to classes or types of services delivered. Non-limiting examples of process classes may include "incident management," "request management," "change management," and "problem management." These examples are described in more detail below. In accordance with example embodiments, a given process comes into existence or is made active as a "process instance" by being opened or created in response to some opening/creating action that may also implicitly or explicitly designate an associated process class. The opening/creating action may thus be logged in a database. Subsequent activities of the process instance may also be logged, including an action to close or complete the process, as well as any actions in between opening and closing. Process activities and actions may be a mix of automated actions, semi-automated or interactive actions, and manual actions. The complete log for the process instance may form a sort of audit trail that tracks the lifecycle of the process instance.

Example embodiments disclosed herein are directed to applying various statistical operations and analyses to the process lifecycle data in the database in order to generate different views and representations of process performance. This may include performance analysis of particular classes and/or types of processes, as well as performance analysis of activities that may be common to multiple different types of processes. These and other possible forms of process performance analysis may be used to identify problems or issues with classes of processes, with common activities, or with other aspects of processes, and to discover remedies and/or improvements to existing process classes. These are non-limiting examples of applications and uses of automated analysis of process performance.

Accordingly, a first example embodiment may involve a system for analyzing performance of processes carried out within a computational instance of a remote network management platform that is associated with a managed network, wherein the system is disposed within the computational instance, the system comprising: an audit database configured for logging activities within the managed network, wherein instances of service delivery within the managed network are represented by respective process instances, wherein each process instance is associated with a process class and comprises multiple states, wherein the audit database comprises records, and wherein each record of the audit database comprises: (a) an identifier (ID) uniquely associating the record with a process instance, (b) information indicating the associated process class of the identified process instance, and (c) information indicating (i) a state transition from a previous state to a current state of the identified process instance, and (ii) a timestamp of the state transition; and one or more server devices disposed within the remote network management platform, wherein the one or more server devices are configured to: receive, from a client device communicatively connected with the managed network, a request to view information representative of multiple process instances, the request including filter criteria associated with one or more data fields of the audit database records; in response to the request, select a plurality of process instances according to the filter criteria applied to the one or more data fields of the audit database records; generate a graphical representation of interconnections between the one or more data fields of the selected plurality based on a statistical analysis of the one or more data fields of the audit database records corresponding to the selected plurality of process instances; and transmit the graphical representation to the client device.

In a second example embodiment may involve a method for analyzing performance of processes carried out within a computational instance of a remote network management platform that is associated with a managed network, wherein activities within the managed network are logged in an audit database, wherein instances of service delivery within the managed network are represented by respective process instances, wherein each process instance is associated with a process class and comprises multiple states, wherein the audit database comprises records, and wherein each record of the audit database comprises: (a) an identifier (ID) uniquely associating the record with a process instance, (b) information indicating the associated process class of the identified process instance, and (c) information indicating (i) a state transition from a previous state to a current state of the identified process instance, and (ii) a timestamp of the state transition, and wherein the method comprises: at a server device disposed within the remote network management platform, receiving, from a client device communicatively connected with the managed network, a request to view information representative of multiple process instances, the request including filter criteria associated with one or more data fields of the audit database records; in response to the request, selecting a plurality of process instances according to the filter criteria applied to the one or more data fields of the audit database records; generating a graphical representation of interconnections between the one or more data fields of the selected plurality based on a statistical analysis of the one or more data fields of the audit database records corresponding to the selected plurality of process instances; and transmitting the graphical representation to the client device.

In a third example embodiment may involve a non-transitory computer readable medium having instructions stored thereon for analyzing performance of processes carried out within a computational instance of a remote network management platform that is associated with a managed network, wherein activities within the managed network are logged in an audit database, wherein instances of service delivery within the managed network are represented by respective process instances, wherein each process instance is associated with a process class and comprises multiple states, wherein the audit database comprises records, and wherein each record of the audit database comprises: (a) an identifier (ID) uniquely associating the record with a process instance, (b) information indicating the associated process class of the identified process instance, and (c) information indicating (i) a state transition from a previous state to a current state of the identified process instance, and (ii) a timestamp of the state transition, and wherein the instructions, when executed by one or more processors of a server device disposed within the remote network management platform, cause the server device to carry out operations including: receiving, from a client device communicatively connected with the managed network, a request to view information representative of multiple process instances, the request including filter criteria associated with one or more data fields of the audit database records; in response to the request, selecting a plurality of process instances according to the filter criteria applied to the one or more data fields of the audit database records; generating a graphical representation of interconnections between the one or more data fields of the selected plurality based on a statistical analysis of the one or more data fields of the audit database records corresponding to the selected plurality of process instances; and transmitting the graphical representation to the client device.

In a fourth example embodiment, a system may include various means for carrying out each of the operations of the second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7B illustrates an example audit table, in accordance with example embodiments.

DETAILED DESCRIPTION

Figure 1:
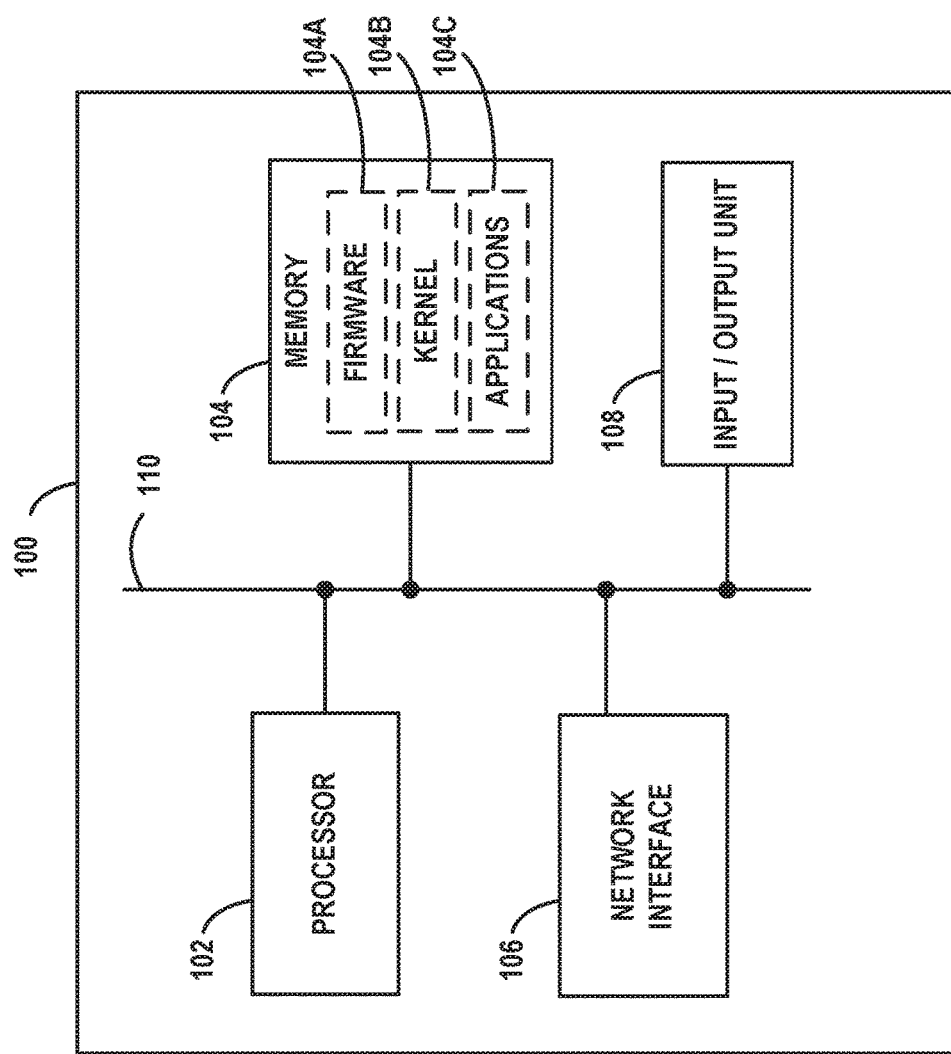
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
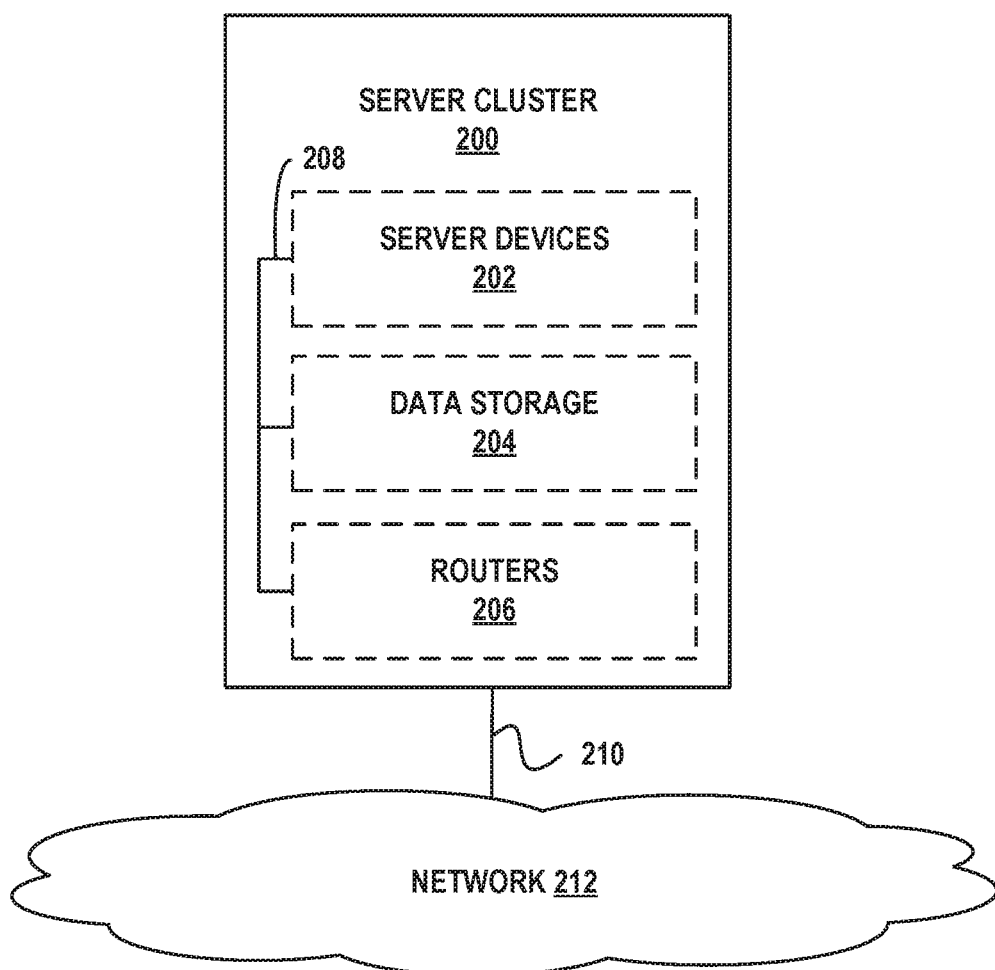
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
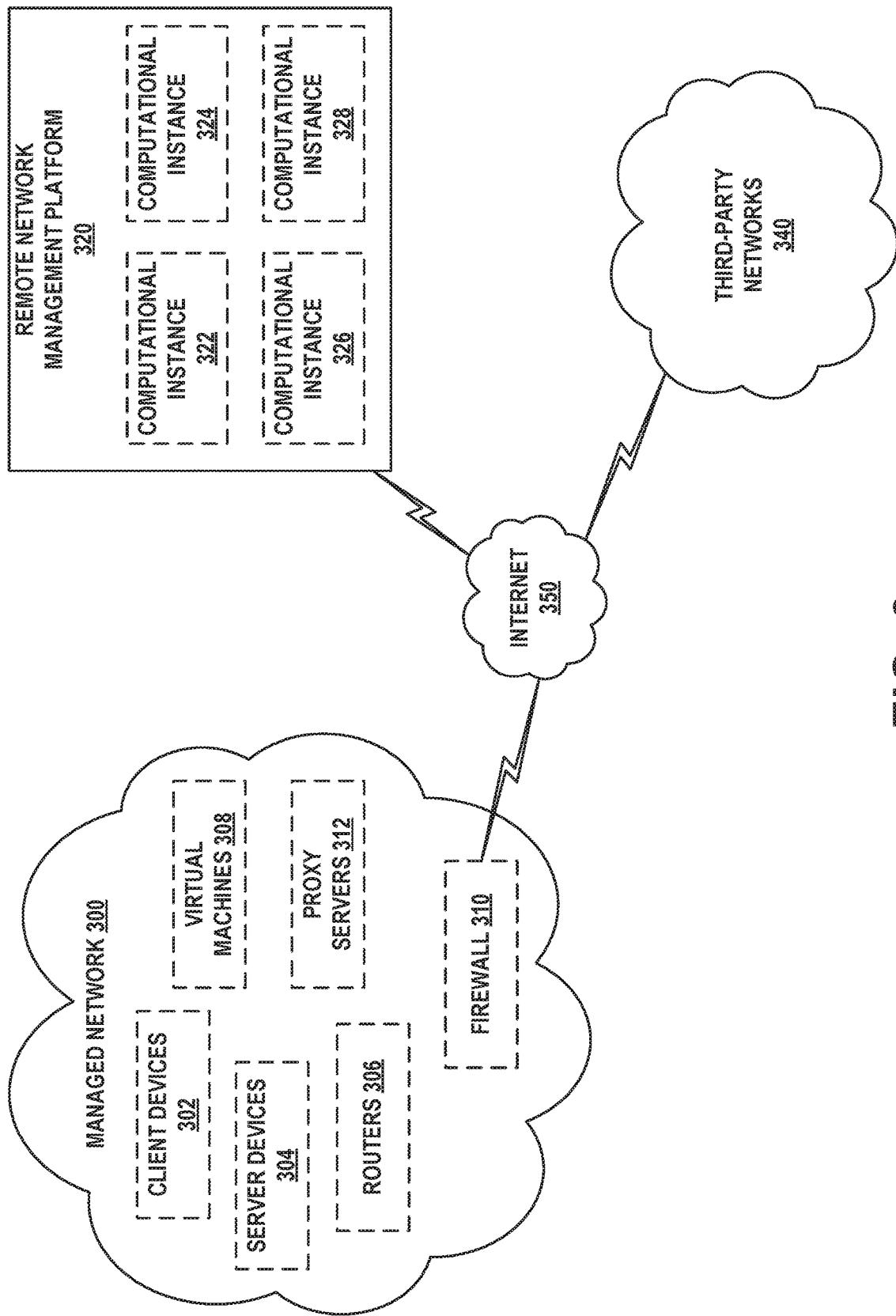
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are commingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents commingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
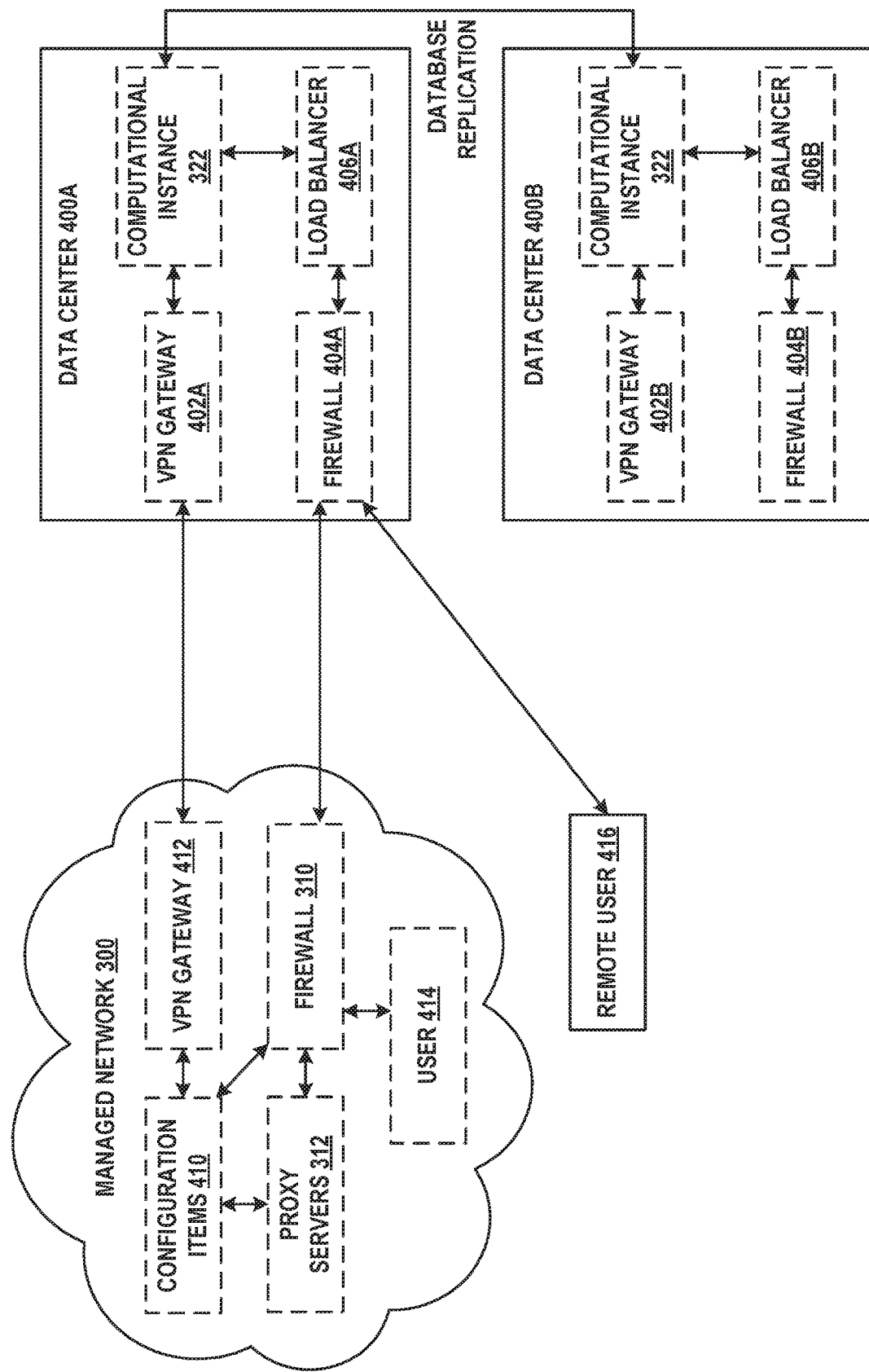
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
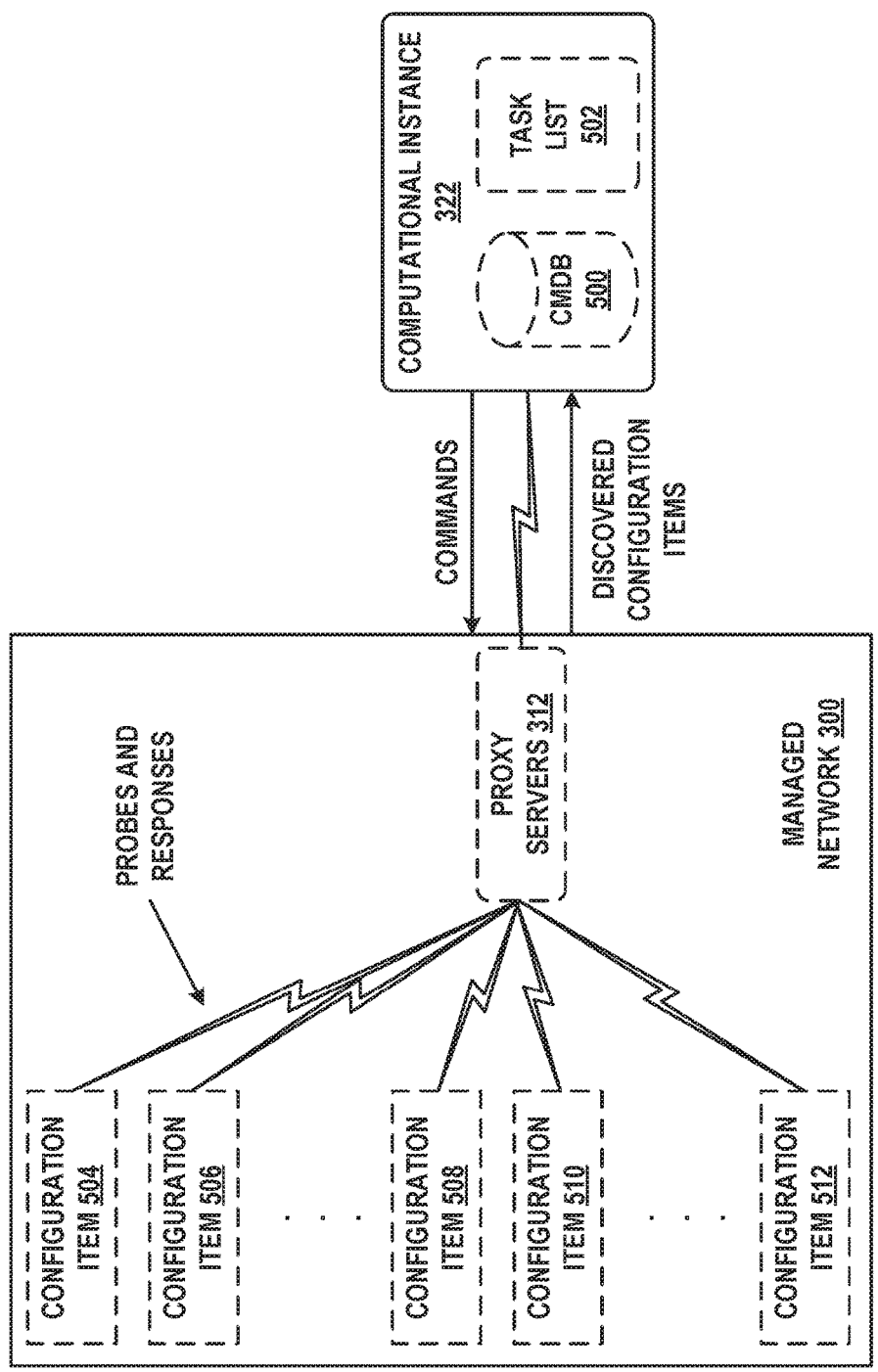
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
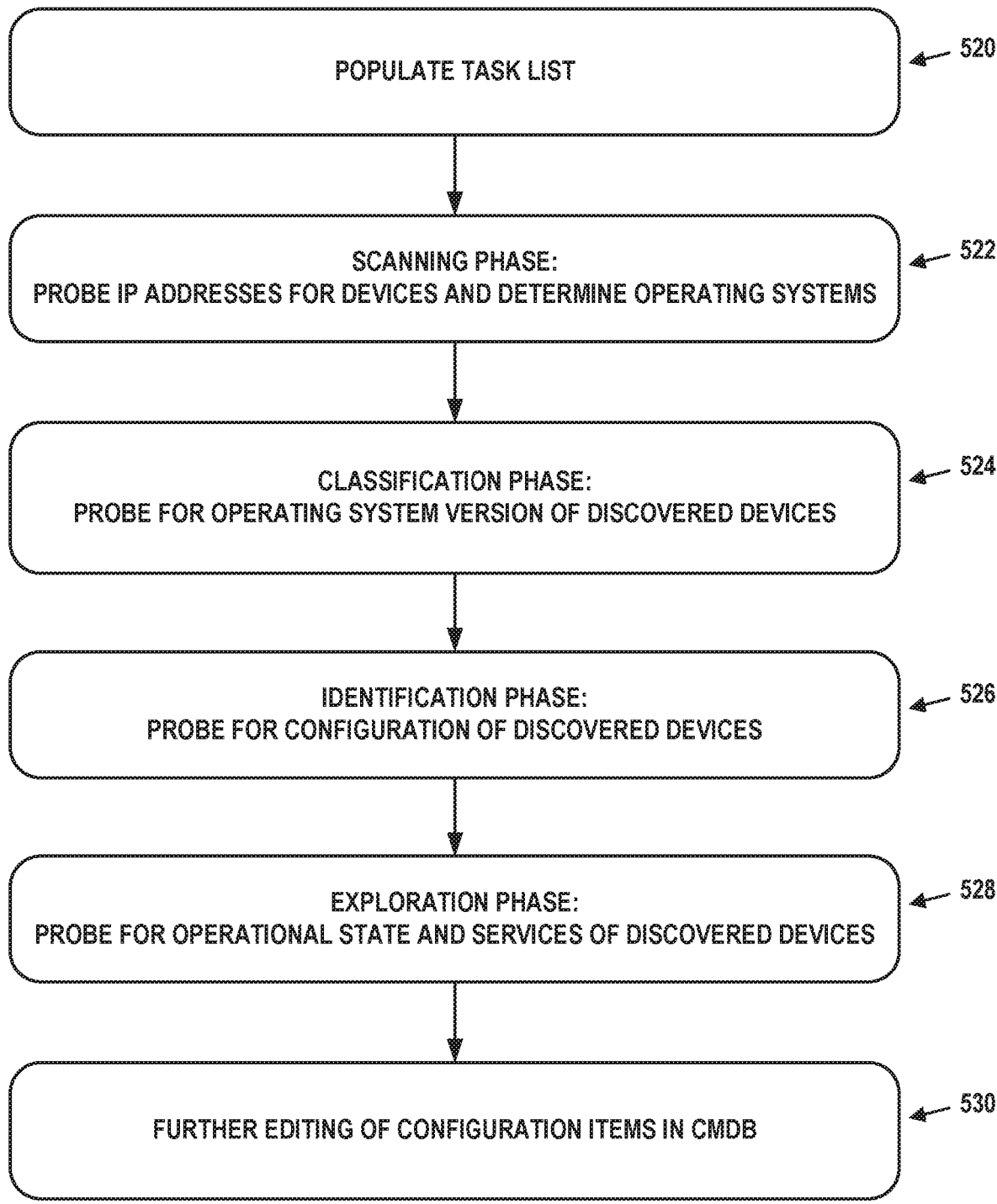
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE AUTOMATION OF PROCESS PERFORMANCE ANALYSIS

Example embodiments of automated process performance analysis are described herein by way of example in terms of processes employed primarily in management and operations of networks. As described above, processes are widely used in the management and operations in organizations and enterprises, as well in other possible contexts. Accordingly, application and/or use of the systems and methods for automated process performance analysis illustratively described herein are not limited to management and operations of networks, but may be applied or used in any context in which processes play a role.

In the context of management and operations of networks and organizations/enterprises, a process may be considered a set of activities for delivering a service. As such, a service defines or identifies "what" is delivered, and a process describes "how" it delivery is achieved. In this sense, a service may be associated with a process class, which may describe the purpose or deliverable of the process class, and prescribe or specify activities or tasks, as well as associated states and state transitions, which may be carried out or traversed by an actual process instance of the process class in order to deliver or achieve the service.

The activities of a process class may involve a mix of automated, semi-automated, and manual or interactive steps or tasks. An example of an automated activity might be a problem report opened in response to automatic detection of network congestion. An example of a semi-automated activity might be a similar problem report where detection of the network congestion is automatic, but entry of the associated problem report is made by IT personnel via an interactive interface. An example of a manual activity might be a similar problem report, but where detection as well as report entry are made by IT personnel. Similar characterizations could apply to other process activities, not just to opening a process, as in the above examples. Further, these are just illustrative examples, and not intended to be limiting with respect to example embodiments herein.

It may not be necessary or required for all possible activities of a process class to be carried out or performed, or all possible states to be visited, by a given process instance in order to deliver the associated service or to accomplish the intended purpose of the process class. For example, the activities of a process class may represent a set of best practices for delivering a service, whereas a process instance of the process class may deviate from the best practices and still deliver the service. Or a given process instance may fail to deliver the service or achieve its intended purpose for one reason or another.

In the discussion herein, the term "activities" used in connection with a process class refers to activities that are defined or specified in association with the process class, and thus identify and/or prescribe activities that a process instance of the process class may carry out. When used in connection with a process instance, the term "activities" refers to actual activities carried out or performed as part of the lifecycle of the process instance. It will be appreciated that process classes and/or process instances are defined and/or specified herein by way of example in terms of "activities." That is, processes could additionally or alternatively be defined in terms of process steps, process tasks, or other actions descriptive of a process, for example.

As described above, process classes and process instances may also be described in terms of states and state transitions, which may be associated with activities. Thus, a given process state may be defined by one or more activities associated with the given state. For example, a process state may be associated with a manual review of a problem escalation request. Similarly, one or more activities may be associated with a state transition. For example, manual approval of a problem escalation request may cause a process to transition from a request state to a granted state. These are just a few examples of the associations between process states and state transitions and process activities.

For each process instance, the activities, states, state transitions, and times associated with them may be considered, among other possible process properties, as describing the process instance's lifecycle. In accordance with example embodiments, the lifecycle of each process instance may be recorded in the form of records in an audit database that is associated with activities within a managed network. More particularly, whether undertaken autonomously, semi-autonomously, or manually, one or more aspects of an activity may cause or involve logging of a record associated with a process instance to the audit database. Each record may include a unique identifier of a process instance, as well as information indicating a process class, a new state, the old state, a timestamp, and an indication of who or what caused the activity and states to be logged. By logging all activity for a given process instance in the audit database, the records associated with the given process instance may thus form an audit trail representing the lifecycle of the process instance.

As an example, a user request for a change of password entered via an interactive user interface on a computing device in a managed network may trigger an automatic opening of an instance of a change management process. This action may the cause a record associated with the process instance to be entered in the audit database. The record may include a unique identifier of the process instance, as well as information indicating the process class (a change management process in this example), new state (e.g., "request opened"), the old state (e.g., "inactive"), a timestamp, and an indication that the request was entered by the user. Subsequent activities and states for this instance of the change management process may be similarly logged to the audit database.

In accordance with example embodiments, the lifecycles of one or more pluralities of process instances may be statistically analyzed to determine or discover performance properties of the processes in the one or more pluralities. By applying various selection criteria to identify a given plurality of process instances, the performance analysis may be made to focus on particular types or categories of process classes, activities, states, and/or other characterizing information stored in the audit database records. Further analyses may also be performed to sharpen the focus on particular aspects of the pluralities, possibly leading to discovery of previously undetected problems, identifying operational parameters that should be monitored, or suggesting modifications to improve one or another process class. These are just a few examples of advantages that may be derived from automatic performance analysis of processes.

Figure 6:
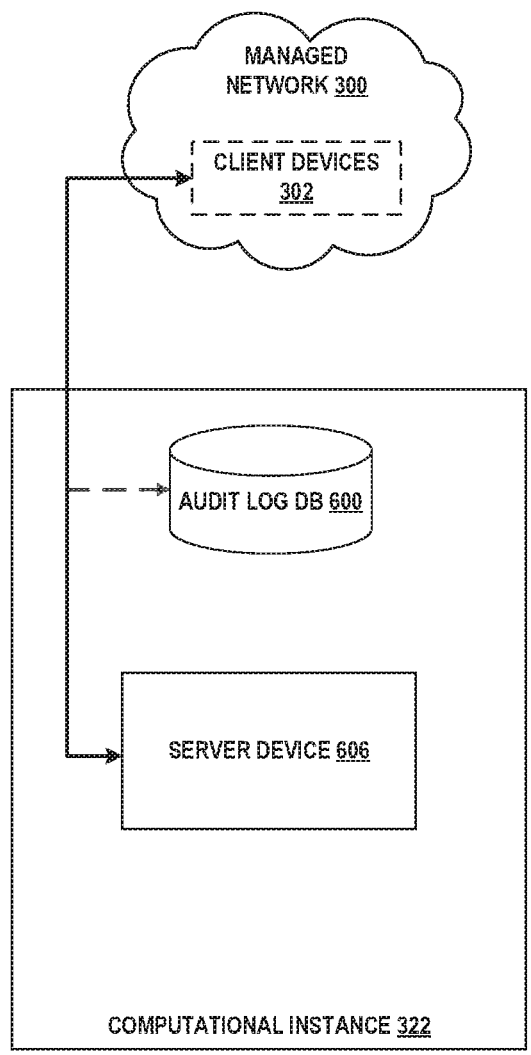
FIG. 6 illustrates a schematic drawing of certain elements of a system for process performance analysis, in accordance with example embodiments.

FIG. 6 illustrates a schematic drawing of certain elements of a system for process performance analysis, in accordance with example embodiments. A computational instance 322 may include a server device 606 and an audit log database 600 (or just audit database, for short), and may be associated with a managed network 300. As described in connection with FIG. 3, for example, the computational instance 322 may be disposed within a remote network management platform 320. In the illustration of FIG. 6, the managed network 300 is depicted only with client devices 302; other components and devices shown in FIG. 3 have been omitted for the sake of clarity in the figure.

As indicated by the double arrow, the client devices 302 may communicate with the server device 606. A dashed arrow to the audit database 600 indicates communication between the audit database 600 and both the client devices 302 and the server device 606. Communications with the audit database 600 may include logging and recording operations, such as opening process instances, logging activities and state operations associated with process instances, and other logging/audit transactions for tracking activities in the managed network 300. Other communications with the audit database 600 may entail retrieval of records for analysis of process performance, in accordance with methods and techniques described herein. The illustration in FIG. 6 is just an example of a system or aspects of a system that may be used to implement methods and techniques described herein for analysis of performance of process in a managed network, including processes in an organization/enterprise that operates within or on top of the network. The example system of FIG. 6 is not intended to be limiting with respect to example embodiments herein.

Figure 7A:
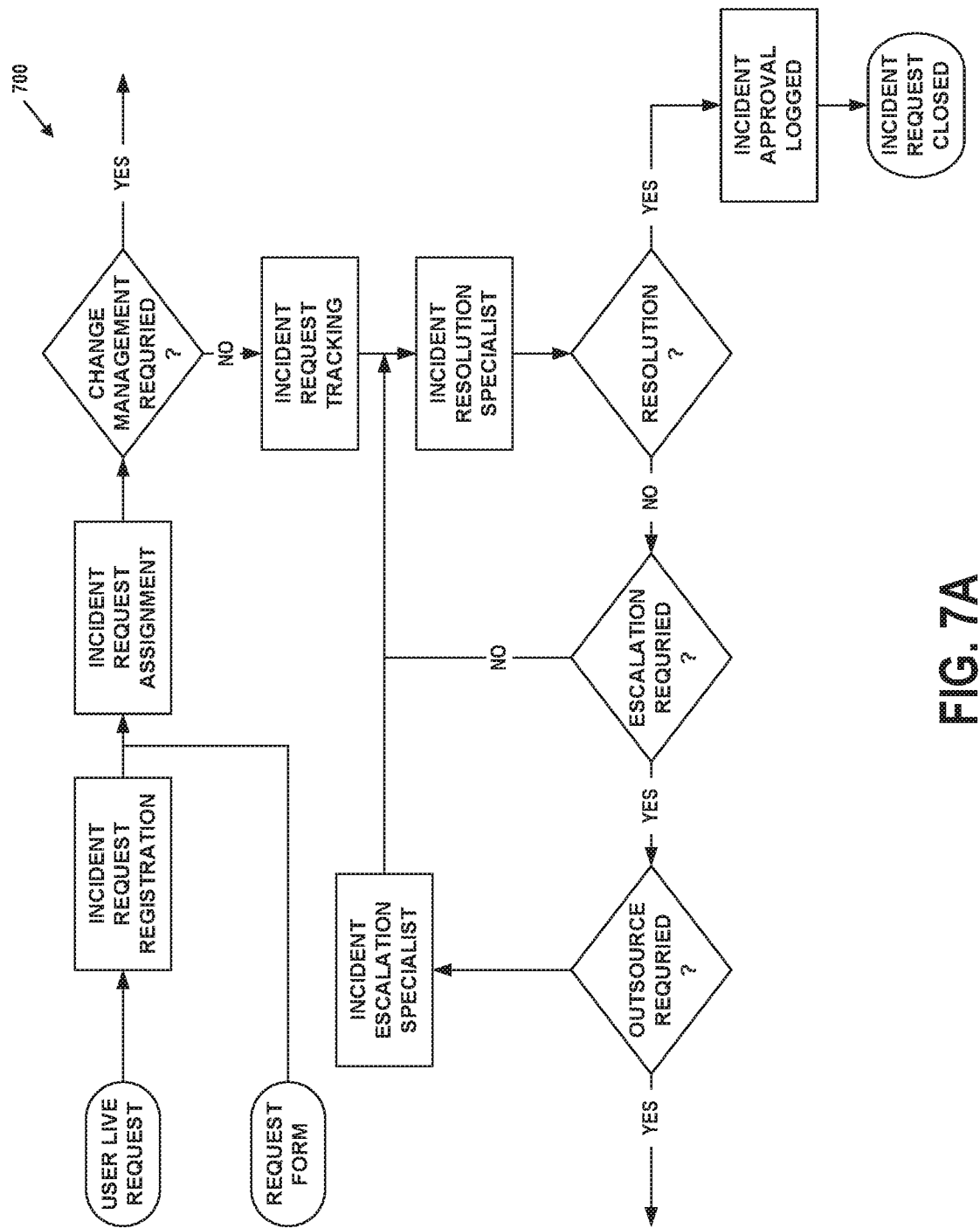
FIG. 7A is an illustrative process-flow diagram of an example process, in accordance with example embodiments.

FIG. 7A is an illustrative process-flow diagram of an example process 700, in accordance with example embodiments. More particularly, the example process 700 is an example incident process depicted in terms of a block diagram representing process flow. As such, example process 700 may represent a process class defining process flow for an incident process. The blocks and the illustrated flow between them could, for example, be a set of best-practice activities for incident management in a network, and for delivering service associated with an incident opened or created in the network. It will be appreciated that FIG. 7A is a conceptual illustration, in the sense that the specific activities and/or states in the blocks may not necessarily depict actual activities and/or states of an actual process class. Rather, they represent the concept of a process describable in terms of a prescribed flow that may be audited and recorded for any given process instance of the process class.

By way of example, process 700 may be initiated by a live user request being received, for example at a computing device 302 or by a receipt of a request form, for example at a server 606. The live user request may invoke an "incident request registration," which may feed an "incident request assignment." Form entry may go directly to the incident request assignment. Both the incident request registration and the incident request assignment may be associated with activities that are logged to the audit database 600. After incident request assignment, a determination may be made if the incident request should be trigger or be transferred to a change management process, represent by an arrow labeled "Yes" and point away from the process 700. If not, the next activity in the example is "incident report tracking," which then leads to "incident resolution specialist." The next activity is a determination if the incident has been resolved. If it has, then "incident approval logged" is invoked, and finally the incident request is closed. If resolution has not been achieved, then a determination is made if escalation is required. If not, then the process returns to incident resolution specialist. If resolution has not been achieved, a further determination is made if escalation needs to be outsource, in which case, the process is directed to outsourcing activities not shown in the FIG. 7. If outsourcing is not needed, then "incident escalation specialist" is invoked, and flow is eventually returned to incident resolution specialist.

Each of the activities and/or states represented in the blocks of FIG. 7 may include autonomous operations, semi-autonomous operations, and/or manual operation. Further the description of the process flow presented above may represent suggest or best practice for an actual instance of the example process class. Accordingly, not every process instance need necessarily follow the same flow, and some process instance could even deviate from the flow. Again, process 700 represents the concept of defined process flow that may be tracked in terms of audited activities recorded in the audit database 600.

In accordance with example embodiments, the activities of a process may include one or more operations that cause the activities or associated states to be logged to the audit database 600. For example, a user request to that opens a change request may be automatically logged to the audit database. As another example, a determination by change management personal as to whether or not escalation is required could also be automatically logged. These are just two non-limiting examples.

FIG. 7B illustrates an example audit table 702, in accordance with example embodiments. The example audit table 702 includes six example columns, namely, "ID," "Class," "Old State," "New State," "Time," and "Entered By." Horizontal ellipses to extending to the right of the table indicate that there could be additional columns. The example table 702 is shown to include five rows 704, 706, 708, 710, and 712. The vertical ellipses in the figure indicate that there could be additional rows. In an example embodiment, the audit table 702 may be implemented as a database table in the audit database 600; each row may then be a record in the table, and each column may be field of the records.

In accordance with example embodiments, the ID may associate each record with a process instance. The class may associate each process instance with a process class. In an example embodiment process classes may be defined for incident management, such as an employee request for a password reset; request management, such as a manager request for a new laptop for a new employee; change management, such as a procedure for updating a database server with a security patch; and problem management, such as a procedure to repair an email server that has crashed after hours, where the suggested practice is to analyze and resolve the problem. It will be appreciated that these are just illustrative and non-limiting examples of process classes. Other process classes could include human resources adding new employees, security incident analysis, and customer care and case analysis.

The accumulation of audit records for process instances over time may be used to analyze statistical properties of multiple process instances. By selecting audit records according to specific criteria, statistical analyses may be focused on particular processes classes, particular process activities or states, and particular service areas of the network to the extent that one or more data fields of records may be correlated with service areas. For example, by selecting audit records according to a given process class, a statistical view of process performance for the given process class may be derived. As another example, by selecting audit records according to a given set of activities which may be common among process instances of various different process classes, process performance for the given set of activities may be derived. And by correlating activities with different service areas, such as different personnel teams, performance of the different service areas may be evaluated in relation to their roles in process support.

Figure 7C:
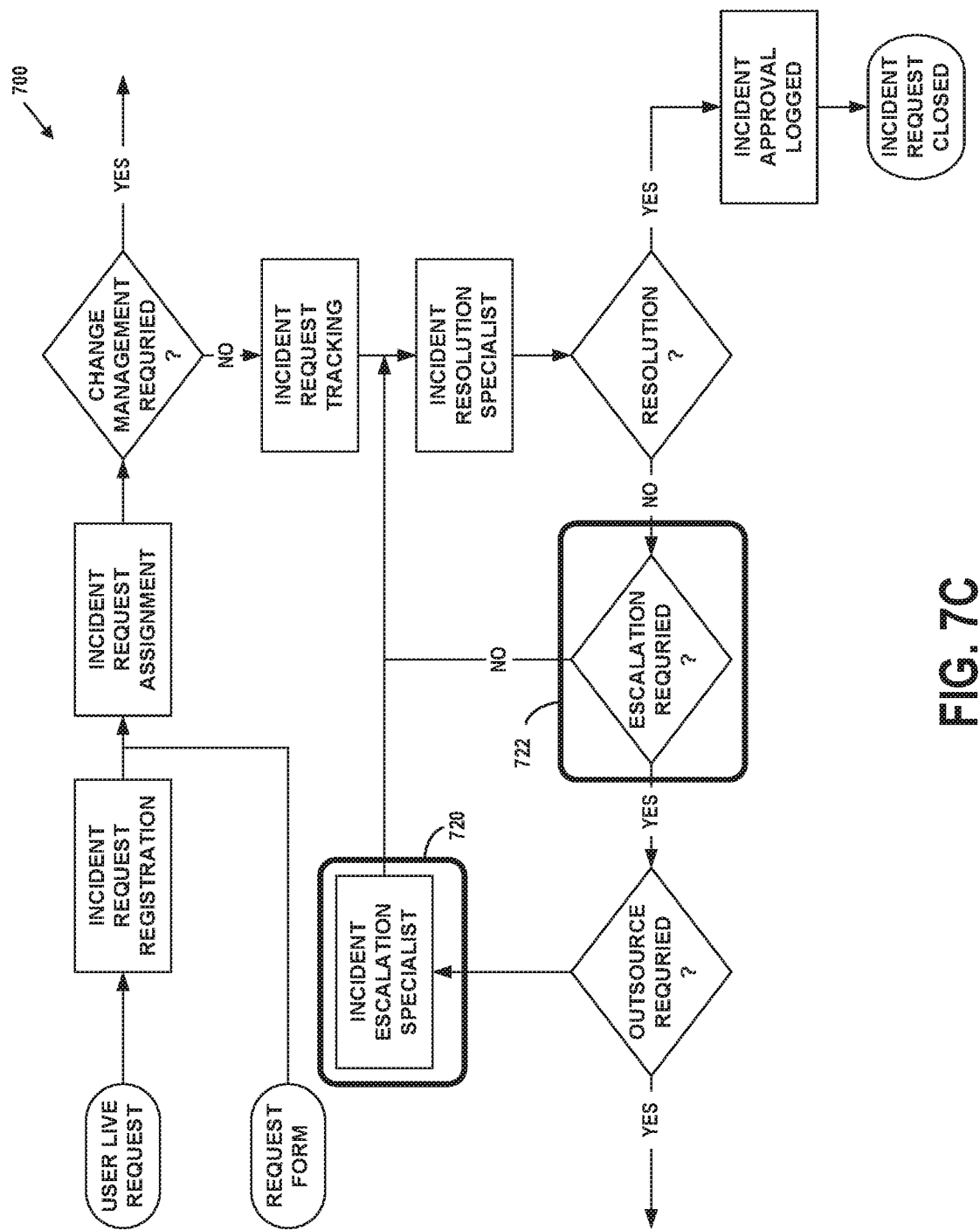
FIG. 7C is an illustrative process-flow diagram of an example process with process performance analysis diagnostics overlayed, in accordance with example embodiments.

FIG. 7C shows the process-flow diagram of the example process of FIG. 7B with example process activities identified by performance analysis as possible problems or bottlenecks, in accordance with example embodiments. The illustration of FIG. 7C is again conceptual in the sense that the underlying statistical analysis is not explicitly shown. Rather, it is supposed by way of example that such an analysis may identify activities of the process 700 that appear to be overloaded. In an example analysis, all or some audit records associated with an incident management process may be selected. By evaluating the distribution of activities and/or states of the identified records, as well as the distribution of the activities and states over time, a statistical analysis may reveal a time-averaged number occupancy of the activities and states. That is, a determination may be made of an average amount of time and resources spent in each activity and/or state of the incident management process. Given a target amount of time and resources for each activity and/or state, a relative load may then be derived.

In the conceptual example of FIG. 7C, excessive load indicators 720 and 722 may be overlayed on the incident escalation specialist and the "escalation required" blocks to indicate that the load on these activities exceeds some threshold. In accordance with example embodiments, an analysis such the one just illustrated may be carried out by the server 606 in response to a request from a user, such as a process analyst, at a computing device 302 in the managed network 300. In response, the server may select a plurality of audit records associated with the incident management process, carry out the requested analysis, including generating a graphical representation of the incident management process process-flow diagram similar to that shown in FIGS. 7B and 7C. The generated diagram may also include the overlayed excessive load indicators 720 and 722. The server device 606 may then transmit the generated graphical representation to the requesting computing device, which may present the graphical representation in a display component. Subsequent evaluation of the graphical representation, or other analysis formats, may be used to trouble-shoot the incident management process, and/or to explore possible improvements to the process, for example.

Advantageously, the data upon which such analysis may be carried out may be collected in the audit database 600 as a matter of routine network management operation. And the analysis may be implemented using a fast and efficient computing program or package. The time-consuming and costly conventional approach of manually observing processes in action and making subjective judgements of what appears to work and what doesn't may thus be eliminated, and replaced by a fast, efficient, and largely automated data collection and analysis process.

Figure 8:
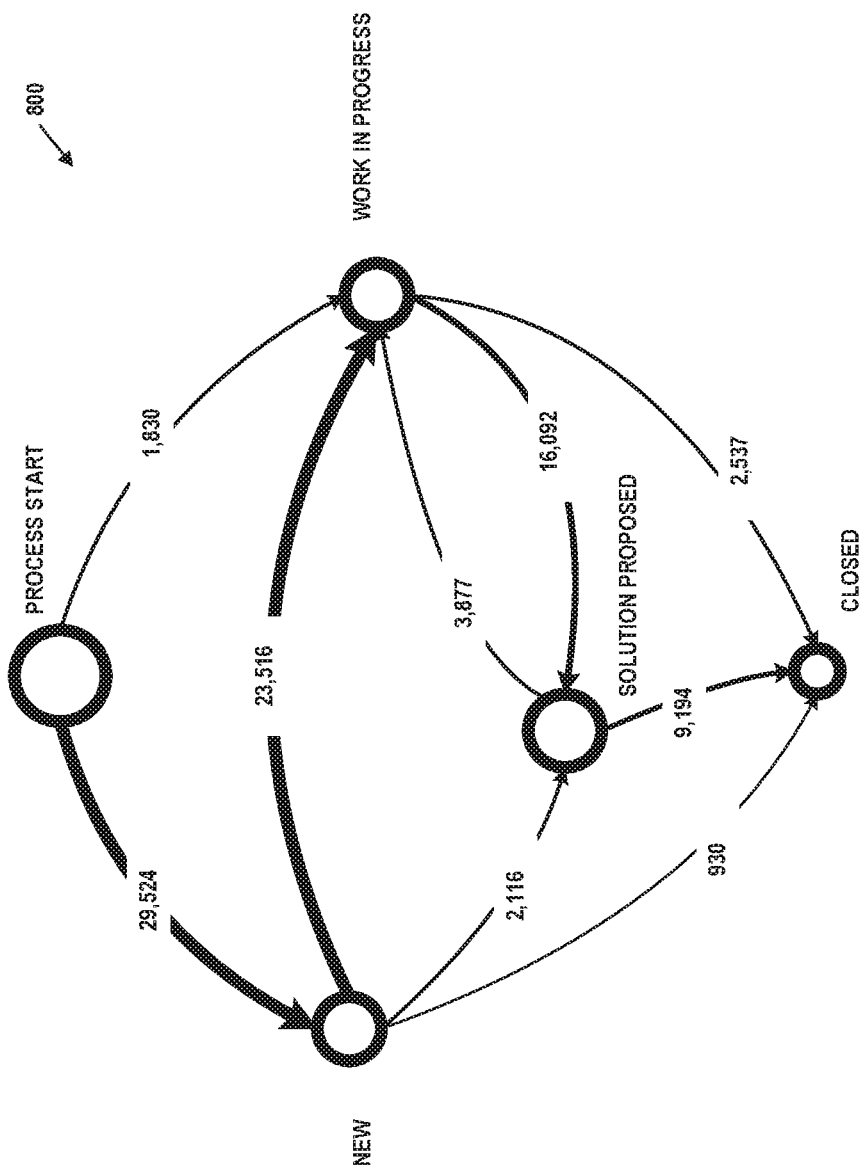
FIG. 8 is an illustrative state-occupancy diagram of an example process generated by a process performance analysis system, in accordance with example embodiments.

FIG. 8 illustrates another example form of process performance analysis generated by a process performance analysis system, in accordance with example embodiments, in this case a state-occupancy diagram 800 of an example process. In accordance with example embodiments, a state-occupancy analysis of a process may be carried out by the server 606 in response, again, to a request from a user, such as a process analyst, at a computing device 302 in the managed network 300. In response, the server may again select a plurality of audit records associated with the incident management process, and determine a distribution of process instances among states of the incident management process. The distribution may also account for transitions between state, thereby enabling transition rates between states to be derived. As in the example of FIG. 7C, the server device 606 may then transmit the generated graphical representation to the requesting computing device, which may present the graphical representation in a display component. Subsequent evaluation of the graphical representation, or other analysis formats, may again be used to trouble-shoot the incident management process, and/or to explore possible improvements to the process, for example.

The example state-occupancy diagram 800 includes just five states for purposes of simplifying the present discussion. Each state is represented graphically as circle corresponding to a node. The size of each node may correspond to the number occupancy of the associated state. By way of example, the states shown are "Process Start," "New,", "Work in Progress," "Solution Proposed," and "Closed." Transitions between states are shown as directed arrows, where the thickness of the line corresponds to the number of transitions; the number of transitions is also indicated for each arrow. In the example, Process Start appears to have the largest occupancy, followed by New, Work in Progress, Solution Proposed, and Closed. As with the example of FIG. 7C, occupancy of states and numbers of particular state transitions may be determined by a statistical analysis involving time-averaging over states and over specified time windows. Transition rates may also be derived from the numbers of transitions and the specified time windows.

As shown by way of example, the largest number of transitions are from Process Start to New, followed by transitions from New to Work in Progress. Other transitions may be evaluated by inspection in the figure. Also by way of example, there are evidently a large number (3,877) of transitions from Solution Proposed back to Work in Progress. To an analyst or other evaluating personnel viewing the graphical representation, for example transmitted back to the requesting computing device, this may indicate a problem with the activities associated with the Solution Proposed state, and thereby suggest further examination of that state and/or its activities. Once more, this sort of analysis and graphical representation may provide an efficient and intuitive perspective on processes of the network (or organization/enterprise).

Figure 9:
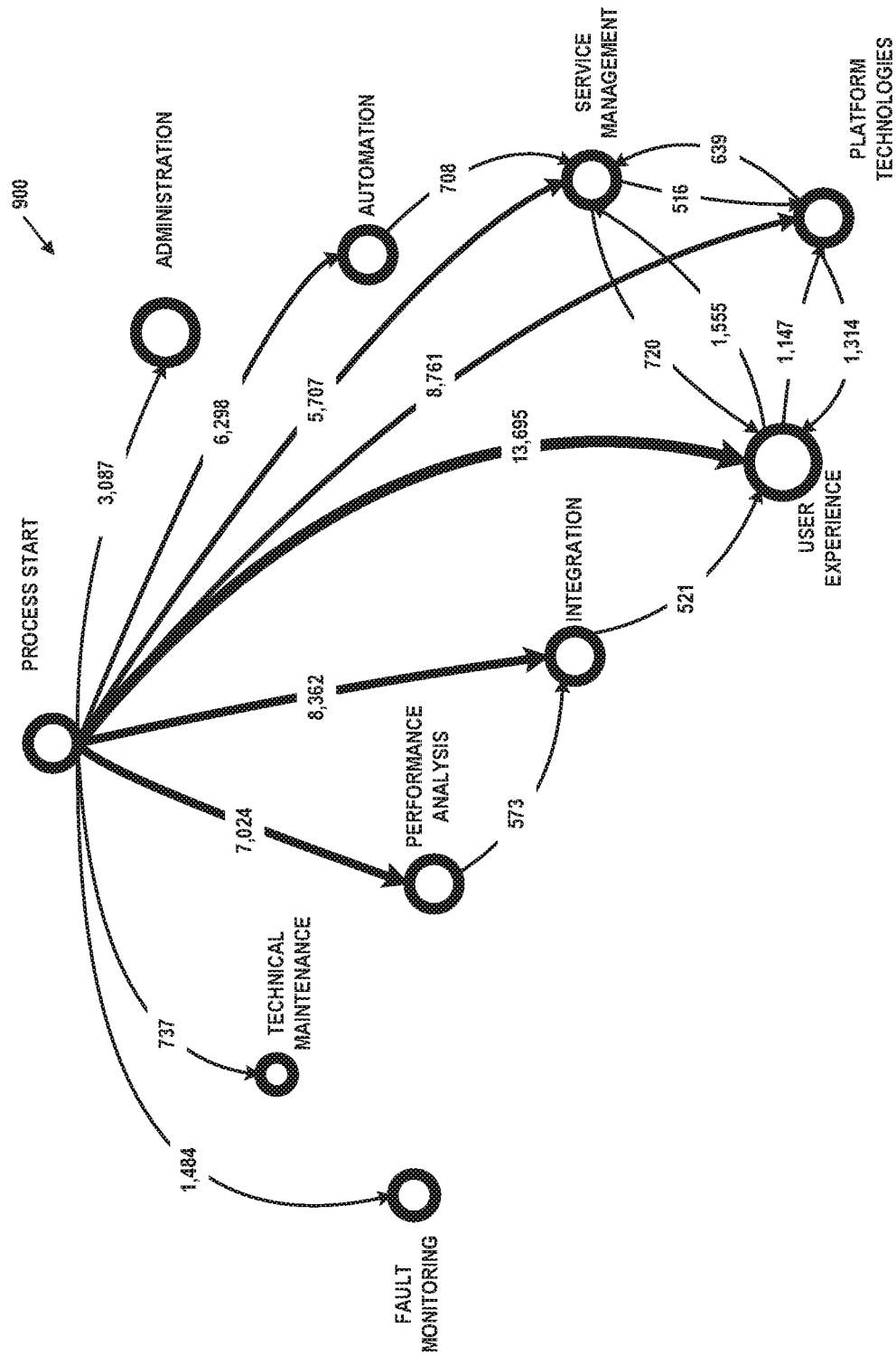
FIG. 9 is an illustrative directed graph of example common activities and/or states generated by a process performance analysis system, in accordance with example embodiments.

FIG. 9 illustrates yet another example form of process performance analysis generated by a process performance analysis system, in accordance with example embodiments, in this case a directed graph 900 of example common activities and/or states. The directed graph 900 provides a representation of occupancy of activities and/or states that may be common to multiple different process classes. In accordance with example embodiments, such an activity/state-occupancy analysis may be carried out by the server 606 in response, once more, to a request from a user, such as a process analyst, at a computing device 302 in the managed network 300. In response, the server may again select a plurality of audit records associated with the one or more process classes on the basis of common or shared activities or states, and determine a distribution of process instances among activities and/or states of the selected process instances. The distribution may also account for transitions between state, thereby enabling transition rates between states to be derived. As in the example of FIGS. 7C and 8, the server device 606 may then transmit the generated graphical representation to the requesting computing device, which may present the graphical representation in a display component. Subsequent evaluation of the graphical representation, or other analysis formats, may be used to troubleshoot particular activities, states, and/or operations associated with the activities and/or states, for example.

In accordance with example embodiments, a given activity or given state, or a set of activities associated with a given state, may also be associated with a particular network operations facility that is responsible for carrying out the given activity or set of activities. The facility may be an autonomous application or program, or may involve a personnel team tasked with carrying out the activity or set of activities. For example, a technical maintenance team may include personnel responsible for resolving technical issues that may be opened by process instances of multiple different process types. As another example, a performance analysis team may include personnel responsible for a variety of network performance analysis tasks which may be common to multiple different process classes. These are just two non-limiting examples.

The example activity/state-occupancy diagram 900 includes a number of different common activities, states, and/or associated operations, as identified in FIG. 9. Each is represented graphically as circle corresponding to a node, and each may be associated with autonomous, semi-autonomous, and/or manual actions. The size of each node may correspond to the number occupancy of the associated state. Transitions between states are shown as directed arrows, where the thickness of the line corresponds to the number of transitions; the number of transitions is also indicated for each arrow. By way of example, "Start Process" is the first node in the directed graph 900. In addition to transitions from Start Process to the other example activities/states displayed, there may also be transitions between nodes. For example, there are evidently 573 transitions from "Performance Analysis" to "Integration." These may represent transitions associated with process instances of multiple different process classes. As such, they may be broadly diagnostic of Performance Analysis as it may apply to multiple different process classes. As with the example of FIGS. 7C and 8, occupancy of states and numbers of particular state transitions may be determined by a statistical analysis involving time-averaging over states and over specified time windows. Transition rates may also be derived from the numbers of transitions and the specified time windows.

As a further example, there is evidently some degree of "ping-ponging" between certain states. Evidently and by way of example, there is ping-ponging between "User Experience" and "Service Management," between User Experience and "Platform Technologies," and between Service Management and Platform Technologies. To an analyst or other evaluating personnel viewing the graphical representation, for example transmitted back to the requesting computing device, this behavior, revealed in the graphical representation of the directed graph 900, may be diagnostic of operational problems or issues with some or all of the activities/states involved.

In all of the examples, the selection criteria may be provided by a filter included in the request. In accordance with example embodiments, the filter may identify particular data fields of the audit records in order to achieve the desired analysis. For example, selection based on process class may be associated with performance analyses of the selected process class, as illustrated by way of example in FIGS. 7C and 8. As another example, selection based on activities may be associated with performance analyses of the selected activities, as illustrated by way of example in FIG. 9. For each of these and other possible statistical analyses of process instances, the graphical representations generated may be broadly described as graphical representations of interconnections between one or more of the data fields of the selected plurality of process instances. For example, a process-class analysis may be considered as generating a graphical representation of interconnections between states and/or activities data fields of records associated with the selected process class. As another example, analysis of common activities of different process classes may be considered as generating a graphical representation of interconnections between different classes of process, as well as between states and/or activities data fields of records associated with the selected records.

Figure 10:
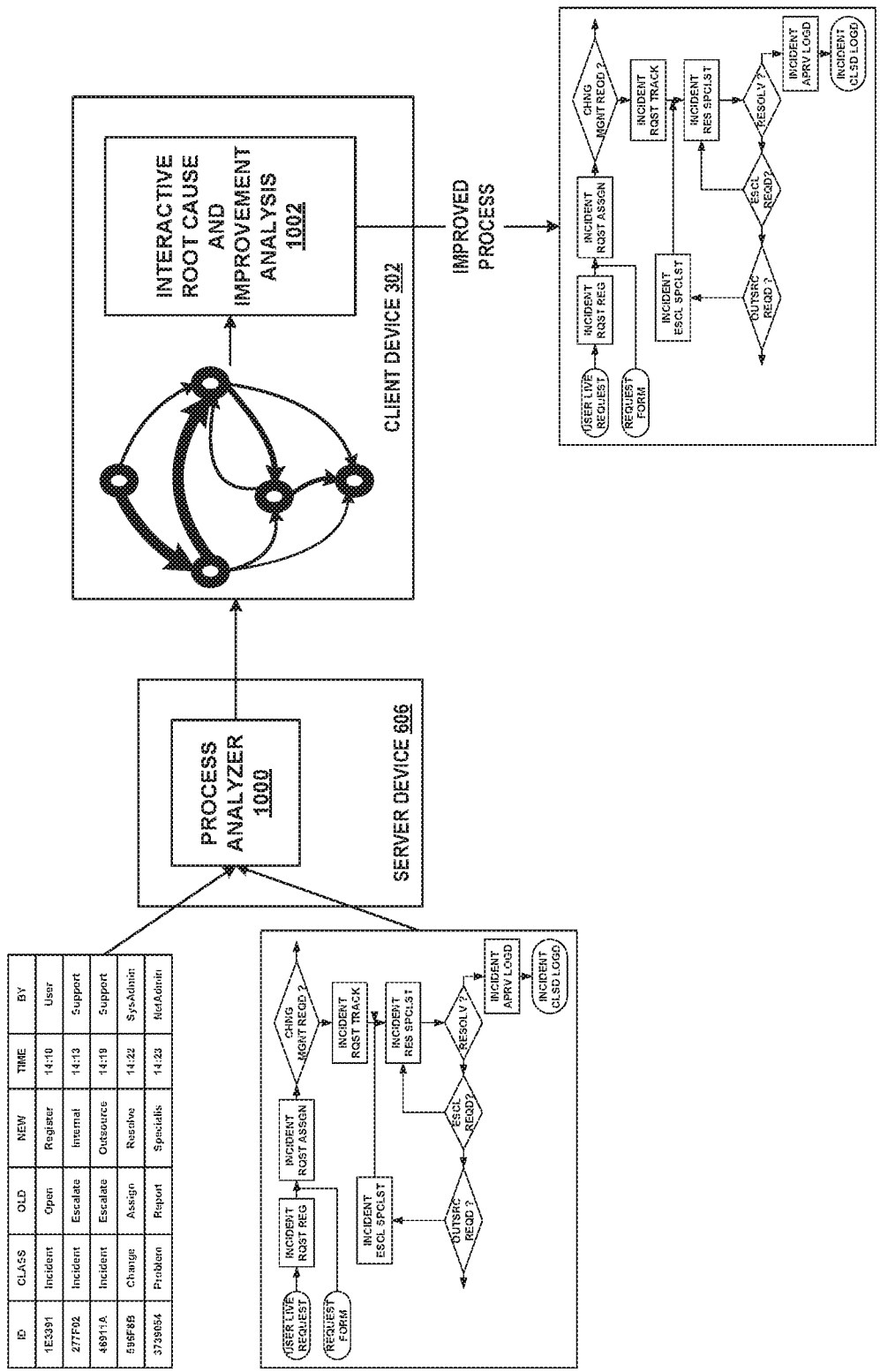
FIG. 10 is a conceptual illustration of an example process performance analysis workflow, in accordance with example embodiments.

FIG. 10 is a conceptual illustration of an example process performance analysis workflow, in accordance with example embodiments. In the example, process performance analysis may be carried out by a process analyzer 606 implemented in a server device 606. Inputs to the analysis procedure are an audit table or database and an identified process class. The process analyzer then provides a graphical representation of the identified process class based on the audit data of actual process instances, as described above. The graphical representation may be presented in a display component of a computing device 302, as shown. In accordance with example embodiments, the display may be part of an interactive root cause and improvement analysis application or program implemented on the computing device. An analyst or other personnel may further explore the graphical representation and/or associated data in order to search for causes of any problems or issues revealed in the graphical representation. For example, if a particular activity or state is shown to be overloaded, performance data for that state or activity may be examined for a cause.

More particularly, a performance analytics (PA) system may be implemented within a computational instance of a remote management platform. Such a PA system may collect key performance indicators (KPIs) of various network components, devices, and operations, for example. KPIs may be used to examine performance and behavior of the entities and components that they track. For example, a KPI may track traffic load through a router. As another example, a KPI may track problem tickets in a queue. These are just two examples. Performance analysis using KPIs may help focus in on potential problem components, locations, or operations in a managed network.

In accordance with example embodiments, root cause analysis of process performance may further be used to identify potential components, locations, or operations in a managed network that may not already have associated KPIs. That is, performance analysis of processes may be used to identify activities and/or states that are underperforming. Root cause analysis may "drill down" into these activities and discover or reveal aspects of the activities that would benefit from KPI monitoring. By creating new KPIs for such activity aspects, future underperformance may thus be avoided through preemptive actions indicated or triggered by conditions revealed through monitoring of the new KPIs.

VI. EXAMPLE METHODS

Figure 11:
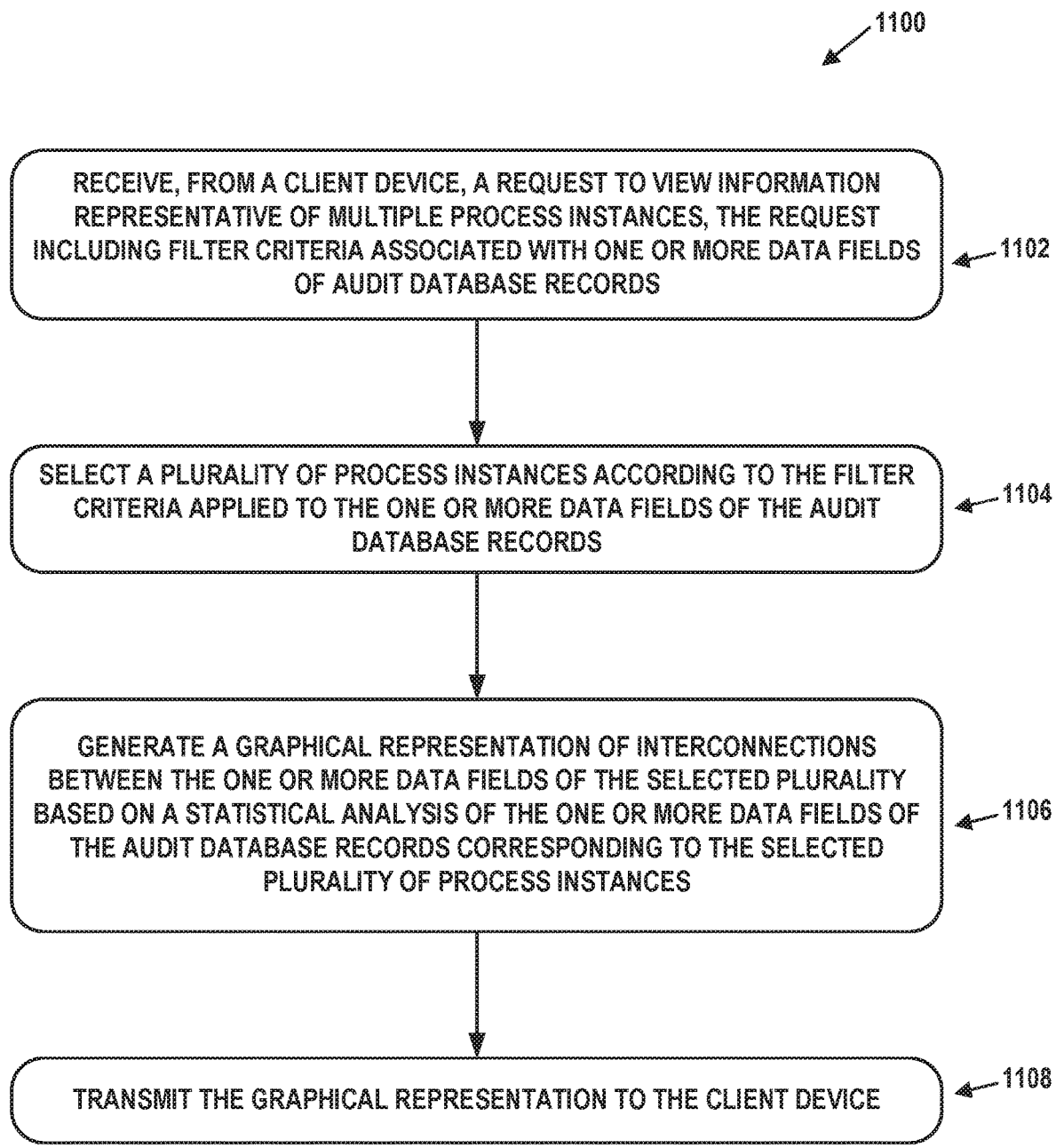
FIG. 11 is a flow chart, in accordance with example embodiments.

FIG. 11 is a flow chart illustrating an example embodiment of a method 1100 for analyzing performance of processes carried out within a computational instance of a remote network management platform that is associated with a managed network. The method illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. In an example embodiment, the method illustrated in FIG. 11 may be carried out by a computing device disposed within a computational instance, such as instance 322, of a remote network management platform, such as platform 320, which remotely manages a managed network, such as network 300.

The embodiments of FIG. 11 may be simplified by the removal of any one or more of the features shown therein. Further, these embodiments may be combined with features, aspects, and/or implementations of any of the previous figures or otherwise described herein.

In an example managed network, instances of service delivery may be represented by process instances, and each process instance may be associated with a process class and may have multiple states. In accordance with example embodiments, activities within the managed network may be logged in an audit database. Each record of the audit database may include: (a) an identifier (ID) uniquely associating the record with a process instance, (b) information indicating the associated process class of the identified process instance, and (c) information indicating (i) a state transition from a previous state to a current state of the identified process instance, and (ii) a timestamp of the state transition.

In accordance with example embodiments, the process class of each process instance may be associated with a type of service of the managed network. Further, the type of service may be incident management, request management, change management, or problem management. Other types of service are possible as well.

Block 1102 may involve a server device disposed within the remote network management platform receiving a request from a client device to view information representative of multiple process instances. The client device may be communicatively connected with the managed network, and the request may filter criteria associated with one or more data fields of the audit database records.

Block 1104 may involve the server device selecting a plurality of process instances according to the filter criteria applied to the one or more data fields of the audit database records. The selection may be made in response to the request from the client device.

Block 1106 may involve the server device generating a graphical representation of interconnections between the one or more data fields of the selected plurality based on a statistical analysis of the one or more data fields of the audit database records corresponding to the selected plurality of process instances.

Finally, block 1108 may involve transmitting the graphical representation to the client device.

In accordance with example embodiments, the previous and current states and the state transitions between them may be associated with one or more activities of the process instance, and each of the one or more activities of the process instance may entail one or more of: an automated action carried out by an application program running on a computing device of the managed network, an interactive action carried out in response to interactive input, or a semi-autonomous action carried out partly by an application program running on a computing device of the managed network and partly by an interactive action carried out in response to interactive input. In addition, one of the activities of the process instance may be associated with creating the process, and another one of the activities of the process instance may be associated with completing the process.

In accordance with example embodiments, the data source view may include an interactive interface for creating new KPIs. As such, the representation, when rendered by a client device may include the interactive interface, and interactive configuration of the data source for the KPI may therefore include receiving interactive input for creation the particular KPI. The interactive input may first be received at the client device, and then received by the computing device via transmission from the client device.

In accordance with example embodiments, the selected plurality of process instances may be, process instances of a given process class, and the graphical representation of interconnections between the one or more data fields of the selected plurality may be a statistical state-occupancy diagram of the given process class. In this case, generating the graphical representation of interconnections may entail associating the previous and current states of each process instance of the plurality with states of the given process class, representing the states of the given process class as nodes in the statistical state-occupancy diagram, and associating the state transition of each process instance of the plurality with a transition between nodes. Then, generation of the graphical representation of interconnections may further entail determining occupancy of the nodes and rates of transitions between the nodes based on a statistical distribution among the nodes and transitions between nodes of the previous and current states and the state transitions between them of the process instances of the plurality.

In further accordance with example embodiments, the example method may then further entail determining a comparison the occupancy of the nodes and rates of transitions between the nodes with pre-determined optimal values of occupancy of the nodes and rates of transitions between the nodes.

In accordance with example embodiments, the previous and current states and state transitions between them may be associated with one or more activities of the process instance, and the graphical representation of interconnections between the one or more data fields of the selected plurality may be a statistical directed graph of common activities shared in among multiple process classes. In this case, generating the graphical representation of interconnections may entail associating the previous and current states of each process instance of the plurality with one or more of the common activities, representing the common activities as nodes in the statistical directed graph of common activities, and associating the state transition of each process instance of the plurality with a transition between nodes. Then, generation of the graphical representation of interconnections may further entail determining occupancy of the nodes and rates of transitions between the nodes based on a statistical distribution among the nodes and transitions between nodes of the previous and current states and the state transitions between them of the process instances of the plurality.

In further accordance with example embodiments, the example method may again then further entail determining a comparison of the occupancy of the nodes and rates of transitions between the nodes with pre-determined optimal values of occupancy of the nodes and rates of transitions between the nodes.

In accordance with example embodiments, the selected plurality of process instances are process instances of a given process class, and the graphical representation of interconnections between the one or more data fields of the selected plurality may be a statistical process-flow diagram of a given process class. In this case, generating the graphical representation of interconnections may entail associating the previous and current states and state and the state transition between them of each process instance of the plurality with one or more process steps of the given process class, representing the process steps of the given process class as blocks in a nominal block diagram flow chart of the given process class, and determining a processing load on each of the process steps based on a statistical distribution among the blocks of the previous and current states and the state transitions between them of the process instances of the plurality. The example method may then further entail determining a comparison of the processing load on each of the process steps with pre-determined threshold values of processing load for each of the process steps.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for analyzing performance of processes carried out within a computational instance of a remote network management platform that is associated with a managed network, wherein the system is disposed within the computational instance, the system comprising:
   an audit database configured for logging activities within the managed network, wherein instances of service delivery within the managed network are represented by respective process instances, wherein each process instance is associated with a process class and comprises multiple states, wherein the audit database comprises records, and wherein each record of the audit database comprises: (a) an identifier (ID) uniquely associating the record with a process instance, (b) information indicating the associated process class of the identified process instance, and (c) information indicating (i) a state transition from a previous state to a current state of the identified process instance, and (ii) a timestamp of the state transition; and
   one or more server devices disposed within the remote network management platform, wherein the one or more server devices are configured to:
      receive, from a client device communicatively connected with the managed network, a request to view information representative of multiple process instances, the request including filter criteria associated with one or more data fields of the audit database records;
      in response to the request, select a plurality of process instances according to the filter criteria applied to the one or more data fields of the audit database records;
      generate a graphical representation of interconnections between the one or more data fields of the selected plurality based on a statistical analysis of the one or more data fields of the audit database records corresponding to the selected plurality of process instances; and
      transmit the graphical representation to the client device.

2. The system of claim 1, wherein the previous and current states and the state transitions between them are associated with one or more activities of the process instance,
   and wherein each of the one or more activities of the process instance is at least one of: an automated action carried out by an application program running on a computing device of the managed network, an interactive action carried out in response to interactive input, or a semi-autonomous action carried out partly by an application program running on a computing device of the managed network and partly by an interactive action carried out in response to interactive input.

3. The system of claim 2, wherein one of the activities of the process instance is associated with creating the process, and another one of the activities of the process instance is associated with completing the process.

4. The system of claim 1, wherein the selected plurality of process instances are process instances of a given process class,
   wherein the graphical representation of interconnections between the one or more data fields of the selected plurality comprises a statistical state-occupancy diagram of the given process class,
and wherein generating the graphical representation of interconnections comprises:
associating the previous and current states of each process instance of the plurality with states of the given process class;
representing the states of the given process class as nodes in the statistical state-occupancy diagram;
associating the state transition of each process instance of the plurality with a transition between nodes; and
determining occupancy of the nodes and rates of transitions between the nodes based on a statistical distribution among the nodes and transitions between nodes of the previous and current states and the state transitions between them of the process instances of the plurality.

5. The system of claim 4, wherein the one or more server devices are further configured to determine a comparison of the occupancy of the nodes and rates of transitions between the nodes with pre-determined optimal values of occupancy of the nodes and rates of transitions between the nodes.

6. The system of claim 1, wherein the previous and current states and state transitions between them are associated with one or more activities of the process instance,
wherein the graphical representation of interconnections between the one or more data fields of the selected plurality comprises a statistical directed graph of common activities shared in among multiple process classes,
and wherein generating the graphical representation of interconnections comprises:
associating the previous and current states of each process instance of the plurality with one or more of the common activities;
representing the common activities as nodes in the statistical directed graph of common activities;
associating the state transition of each process instance of the plurality with a transition between nodes; and
determining occupancy of the nodes and rates of transitions between the nodes based on a statistical distribution among the nodes and transitions between nodes of the previous and current states and the state transitions between them of the process instances of the plurality.

7. The system of claim 6, wherein the one or more server devices are further configured to determine a comparison of the occupancy of the nodes and rates of transitions between the nodes with pre-determined optimal values of occupancy of the nodes and rates of transitions between the nodes.

8. The system of claim 1, wherein the selected plurality of process instances are process instances of a given process class,
wherein the graphical representation of interconnections between the one or more data fields of the selected plurality comprises a statistical process-flow diagram of a given process class,
and wherein generating the graphical representation of interconnections comprises:
associating the previous and current states and state and the state transition between them of each process instance of the plurality with one or more process steps of the given process class;
representing the process steps of the given process class as blocks in a nominal block diagram flow chart of the given process class; and
determining a processing load on each of the process steps based on a statistical distribution among the blocks of the previous and current states and the state transitions between them of the process instances of the plurality.

9. The system of claim 8, wherein the one or more server devices are further configured to determine a comparison of the processing load on each of the process steps with pre-determined threshold values of processing load for each of the process steps.

10. The system of claim 1, wherein the process class of each process instance is associated with a type of service of the managed network, and wherein the type of service is one of incident management, request management, change management, or problem management.

11. A method for analyzing performance of processes carried out within a computational instance of a remote network management platform that is associated with a managed network, wherein activities within the managed network are logged in an audit database, wherein instances of service delivery within the managed network are represented by respective process instances, wherein each process instance is associated with a process class and comprises multiple states, wherein the audit database comprises records, and wherein each record of the audit database comprises: (a) an identifier (ID) uniquely associating the record with a process instance, (b) information indicating the associated process class of the identified process instance, and (c) information indicating (i) a state transition from a previous state to a current state of the identified process instance, and (ii) a timestamp of the state transition, and wherein the method comprises:
at a server device disposed within the remote network management platform, receiving, from a client device communicatively connected with the managed network, a request to view information representative of multiple process instances, the request including filter criteria associated with one or more data fields of the audit database records;
in response to the request, selecting a plurality of process instances according to the filter criteria applied to the one or more data fields of the audit database records;
generating a graphical representation of interconnections between the one or more data fields of the selected plurality based on a statistical analysis of the one or more data fields of the audit database records corresponding to the selected plurality of process instances; and
transmitting the graphical representation to the client device.

12. The method of claim 11, wherein the previous and current states and the state transitions between them are associated with one or more activities of the process instance,
wherein each of the one or more activities of the process instance is at least one of: an automated action carried out by an application program running on a computing device of the managed network, an interactive action carried out in response to interactive input, or a semi-autonomous action carried out partly by an application program running on a computing device of the managed network and partly by an interactive action carried out in response to interactive input,
and wherein one of the activities of the process instance is associated with creating the process, and another one of the activities of the process instance is associated with completing the process.

13. The method of claim 11, wherein the selected plurality of process instances are process instances of a given process class, wherein the graphical representation of interconnections between the one or more data fields of the selected plurality comprises a statistical state-occupancy diagram of the given process class, and wherein generating the graphical representation of interconnections comprises:

associating the previous and current states of each process instance of the plurality with states of the given process class;

representing the states of the given process class as nodes in the statistical state-occupancy diagram;

associating the state transition of each process instance of the plurality with a transition between nodes; and determining occupancy of the nodes and rates of transitions between the nodes based on a statistical distribution among the nodes and transitions between nodes of the previous and current states and the state transitions between them of the process instances of the plurality.

14. The method of claim 13, further comprising determining a comparison the occupancy of the nodes and rates of transitions between the nodes with pre-determined optimal values of occupancy of the nodes and rates of transitions between the nodes.

15. The method of claim 11, wherein the previous and current states and state transitions between them are associated with one or more activities of the process instance, wherein the graphical representation of interconnections between the one or more data fields of the selected plurality comprises a statistical directed graph of common activities shared in among multiple process classes, and wherein generating the graphical representation of interconnections comprises:

associating the previous and current states of each process instance of the plurality with one or more of the common activities;

representing the common activities as nodes in the statistical directed graph of common activities;

associating the state transition of each process instance of the plurality with a transition between nodes; and determining occupancy of the nodes and rates of transitions between the nodes based on a statistical distribution among the nodes and transitions between nodes of the previous and current states and the state transitions between them of the process instances of the plurality.

16. The method of claim 15, further comprising determining a comparison of the occupancy of the nodes and rates of transitions between the nodes with pre-determined optimal values of occupancy of the nodes and rates of transitions between the nodes.

17. The method of claim 11, wherein the selected plurality of process instances are process instances of a given process class, wherein the graphical representation of interconnections between the one or more data fields of the selected plurality comprises a statistical process-flow diagram of a given process class, and wherein generating the graphical representation of interconnections comprises:

associating the previous and current states and state and the state transition between them of each process instance of the plurality with one or more process steps of the given process class;

representing the process steps of the given process class as blocks in a nominal block diagram flow chart of the given process class; and determining a processing load on each of the process steps based on a statistical distribution among the blocks of the previous and current states and the state transitions between them of the process instances of the plurality.

18. The method of claim 17, further comprising determining a comparison of the processing load on each of the process steps with pre-determined threshold values of processing load for each of the process steps.

19. The method of claim 11, wherein the process class of each process instance is associated with a type of service of the managed network, and wherein the type of service is one of incident management, request management, change management, or problem management.

20. A non-transitory computer readable medium having instructions stored thereon for analyzing performance of processes carried out within a computational instance of a remote network management platform that is associated with a managed network, wherein activities within the managed network are logged in an audit database, wherein instances of service delivery within the managed network are represented by respective process instances, wherein each process instance is associated with a process class and comprises multiple states, wherein the audit database comprises records, and wherein each record of the audit database comprises: (a) an identifier (ID) uniquely associating the record with a process instance, (b) information indicating the associated process class of the identified process instance, and (c) information indicating (i) a state transition from a previous state to a current state of the identified process instance, and (ii) a timestamp of the state transition, and wherein the instructions, when executed by one or more processors of a server device disposed within the remote network management platform, cause the server device to carry out operations including:

receiving, from a client device communicatively connected with the managed network, a request to view information representative of multiple process instances, the request including filter criteria associated with one or more data fields of the audit database records;

in response to the request, selecting a plurality of process instances according to the filter criteria applied to the one or more data fields of the audit database records;

generating a graphical representation of interconnections between the one or more data fields of the selected plurality based on a statistical analysis of the one or more data fields of the audit database records corresponding to the selected plurality of process instances; and transmitting the graphical representation to the client device.

* * * * *